Aug. 4, 1964

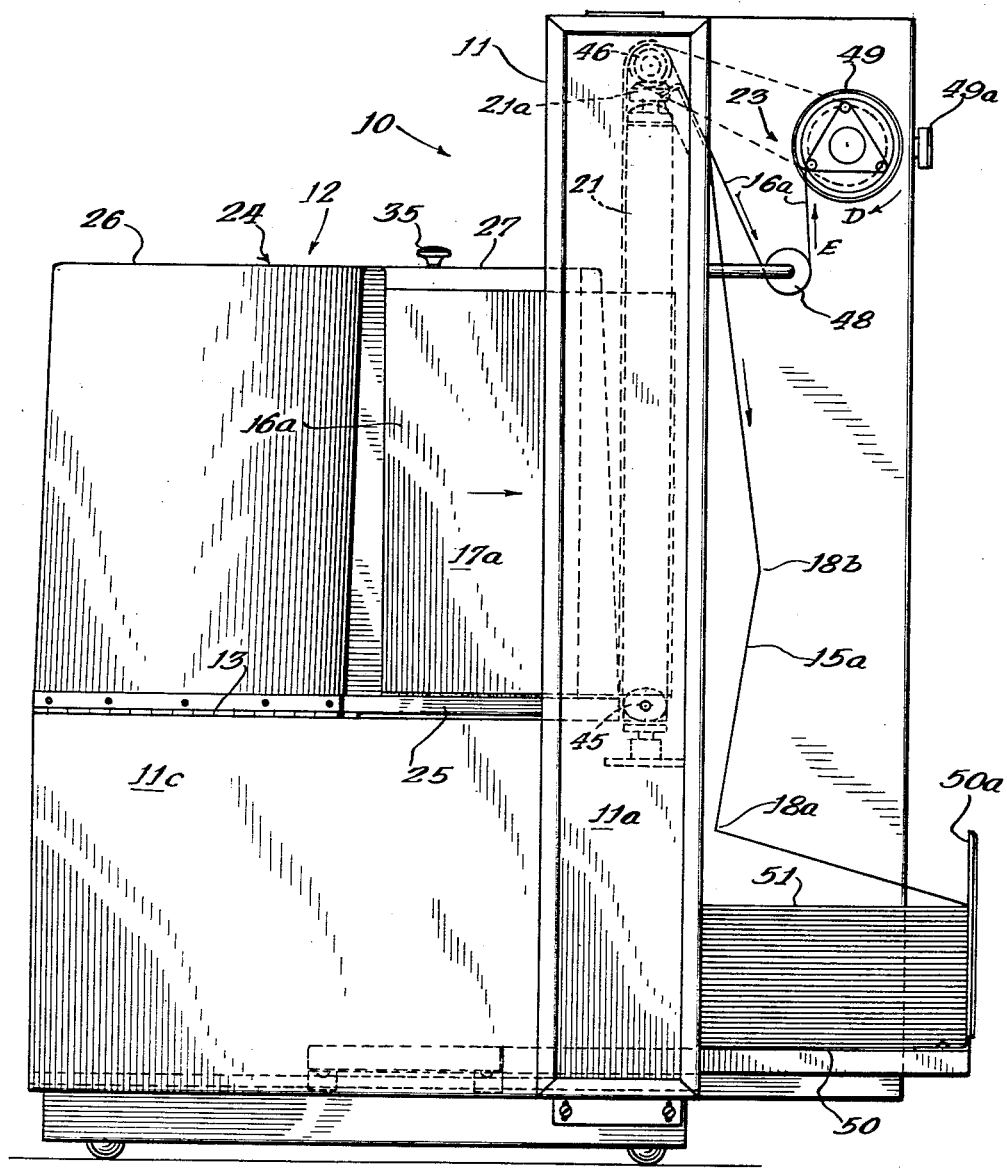

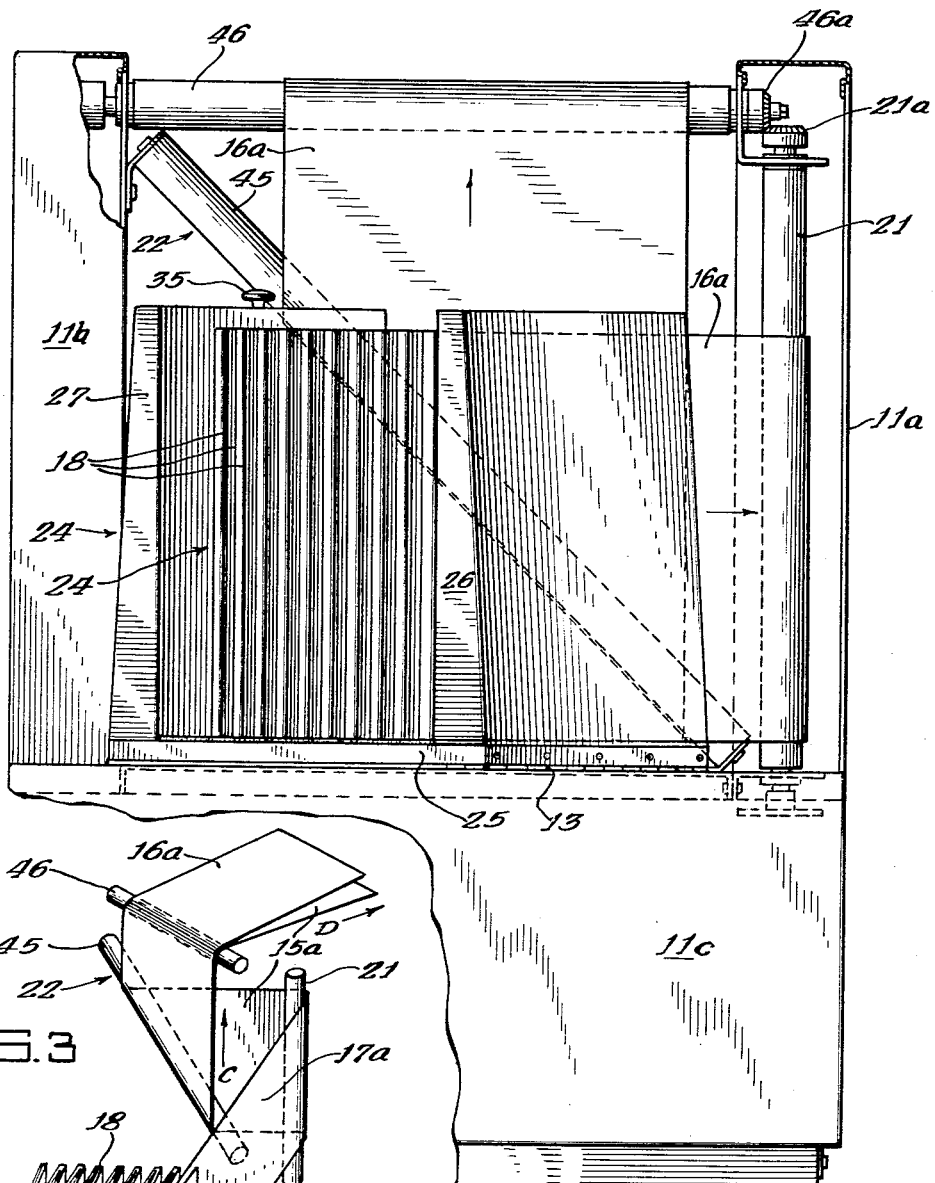
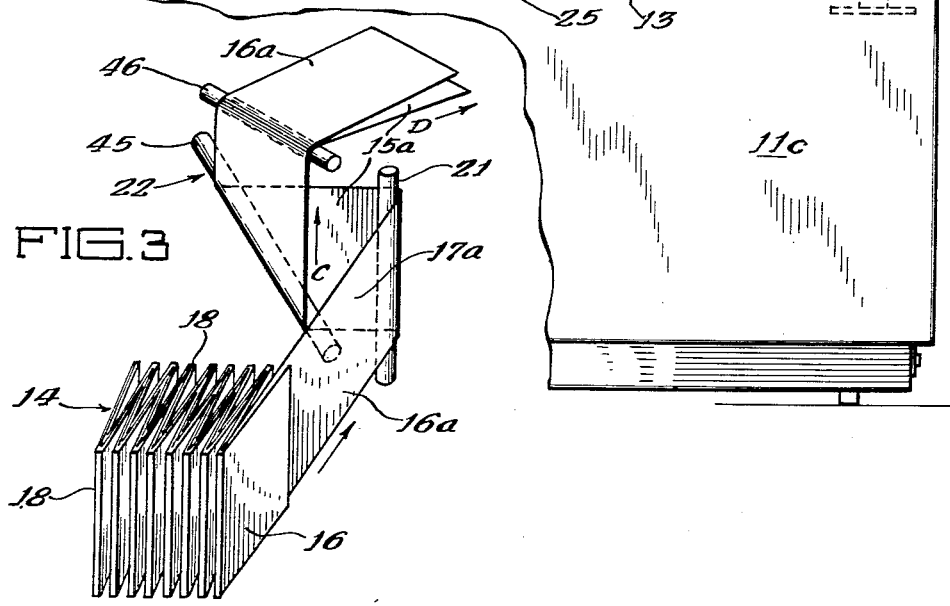

R. M. PINE ET AL 3,143,342

DELEAVER STAND

Filed Oct. 4, 1962

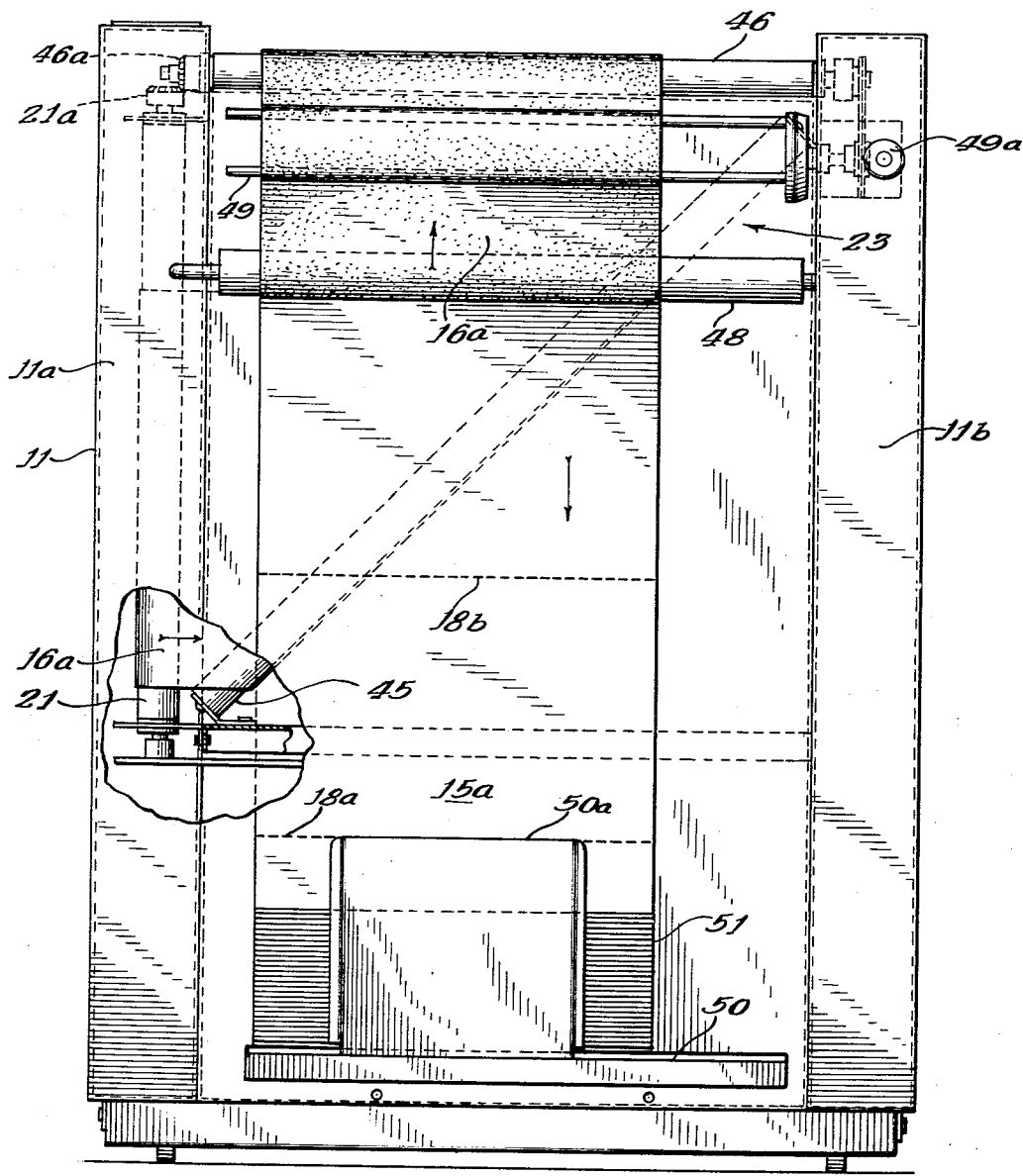

Aug. 4, 1964   R. M. PINE ETAL   3,143,342
DELEAVER STAND
Filed Oct. 4, 1962   6 Sheets-Sheet 5
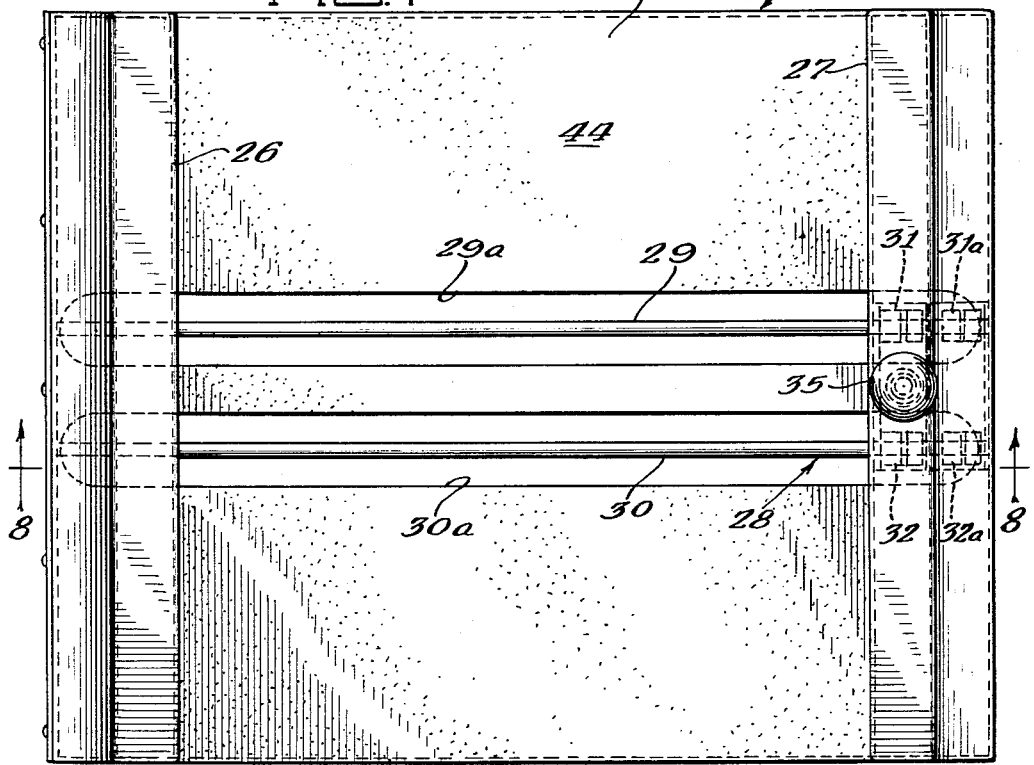
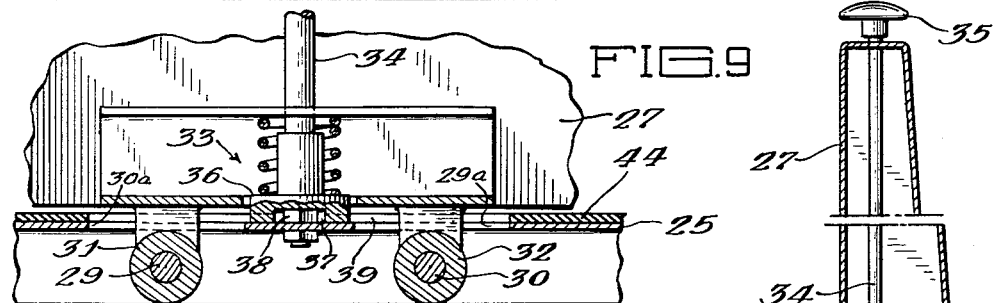
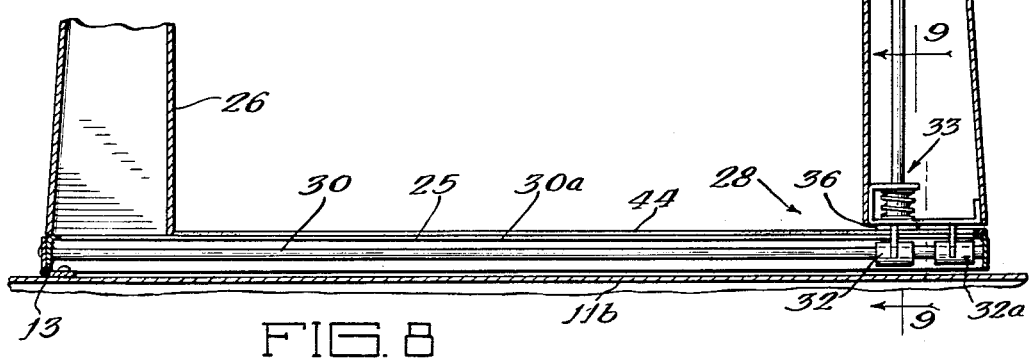

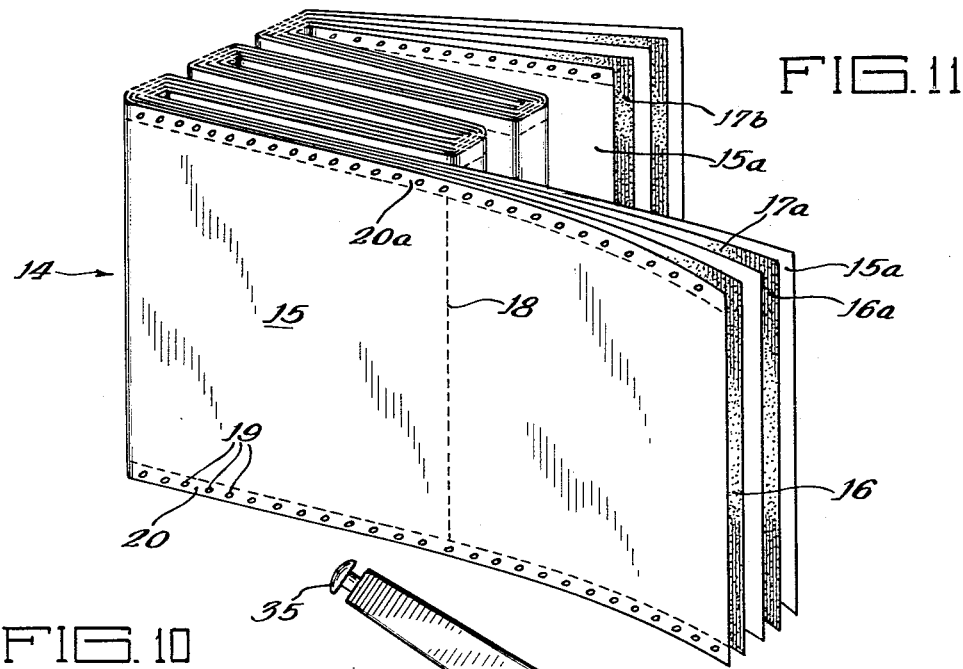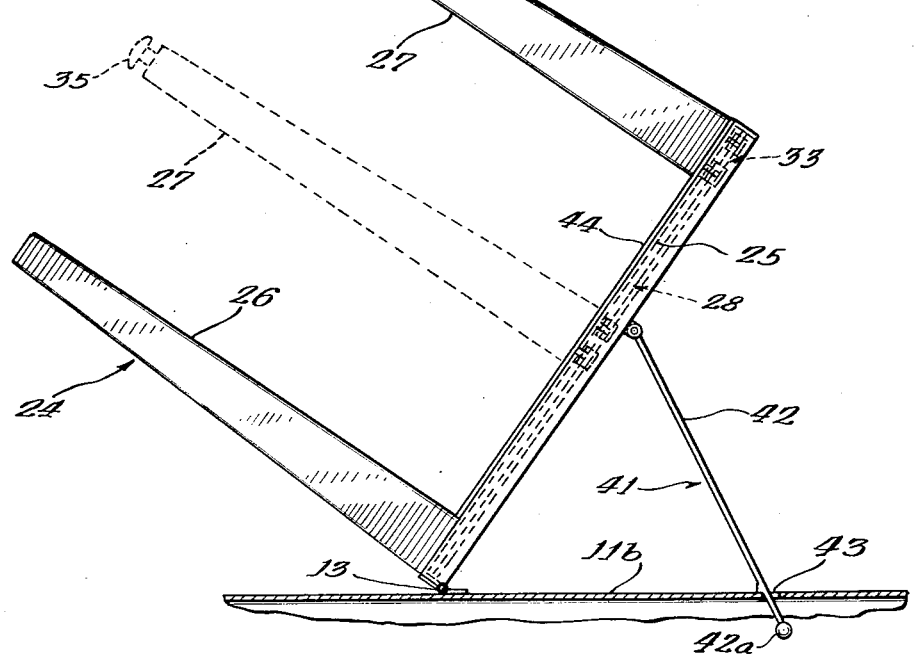

United States Patent Office 3,143,342
Patented Aug. 4, 1964

3,143,342
DELEAVER STAND
Robert M. Pine, Chicago, and Donald J. Steidinger, Clarendon Hills, Ill., assignors to Varco, Incorporated, a corporation of Illinois
Filed Oct. 4, 1962, Ser. No. 228,398
15 Claims. (Cl. 270—52.5)

This invention relates to machines for handling interleaved continuous form stationery and more particularly to a deleaving machine for separating multiple plies of carbon and continuous form stationery from a zigzag folded stack.

Deleaving machines currently in use generally require an extensive amount of time to prepare the machine for operation. Moreover, most deleaver machines can only deleave a finite number of plies of stationery and carbon. If the stack of stationery to be deleaved has more than this number of plies then subsequent "passes" must be made through the deleaver, requiring repeated handling and prepartion of the stationery.

Further complicating present deleaving problems is the fact that the continuous form stationery is increasing in size. The width of a ply of stationery may vary up to seventeen to twenty inches and the former width of approximately eleven inches can no longer be considered as a standard width. The increased size of the stationery also has a direct effect on the weight thereof. A zigzag folded stack which is merely six inches deep weighs approximately thirty pounds. Repeated handling of such a stack of stationery is a rather burdensome task and is somewhat difficult, especially for female business machine operators. Furthermore, present means for loading the zigzag folded stack of stationery into a deleaver mechanism are cumbersome with the result that such a relatively heavy stack of paper may easily slip from the operator's hands and fall into a disheaveled pile unrelated to its original configuration and not at all adapted to be fed into the deleaver machines.

It is therefore an object of this invention to provide a mechanism for deleaving continuous form stationery which is free from the objections mentioned above.

It is another object of this invention to provide a new and improved deleaver mechanism which is adapted to process continuous form stationery of increased dimensions.

It is yet another object of this invention to provide a new and improved deleaver mechanism which provides means for facilitating easy loading thereof with a zigzag folded stack of continuous form stationery.

It is still another object of this invention to provide a new and improved deleaver mechanism which may be easily loaded with a cumbersome pack of zigzag folded superposed strips of continuous form stationery and may be easily placed in operable condition for deleaving thereof wherein the original zigzag folded packs need be handled only once, regardless of the number of superposed plies of stationery and interleaved carbon therein.

It is yet another object of this invention to provide a new and improved deleaver mechanism adapted to deleave a zigzag folded stack of superposed strips of continuous form stationery having transverse lines of weakening with interleaved strips of carbon therein comprising a means for receiving the zigzag folded stack on edge, a means for pulling at least one strip of the stationery transfer material from the stack on edge in a direction generally normal to the transverse lines of weakening, and a means for directing the stationery refold in a zigzag folded stack or to an appropriate business machine for further processing thereof.

Other objects, features and advantages of the present invention will be readily apparent from the following description of the preferred embodiment illustrated in the accompanying drawings, in which:

FIGURE 1 is a side elevational view of a preferred embodiment of the deleaver mechanism of this invention showing the stationery being urged to refold in a zigzag folded stack;

FIGURE 2 is a fragmentary front elevational view in partial section of the device of FIGURE 1 partially illustrating the path of travel of the stationery through the mechanism;

FIGURE 3 is a diagrammatic view of the path of travel of the stationery and carbon sheets through the device of this invention;

FIGURE 6 is a rear elevational view partially in section of the device shown in FIGURE 1;

FIGURE 7 is an enlarged top plan view of the paper receiving tray prior to receiving a zigzag folded stack of continuous form stationery and interleaved carbon;

FIGURE 8 is a fragmentary section view taken along the line 8—8 of FIGURE 7;

FIGURE 9 is an enlarged fragmentary section view taken along the line 9—9 of FIGURE 8;

FIGURE 10 is a fragmentary view showing the paper receiving tray in a position wherein it is adapted to receive the zigzag folded stack of stationery on edge; and FIGURE 11 is a perspective view of a zigzag folded stack of continuous form stationery and interleaved carbon strips on edge with the width of the stationery extending in an upright direction.

Figure 4:
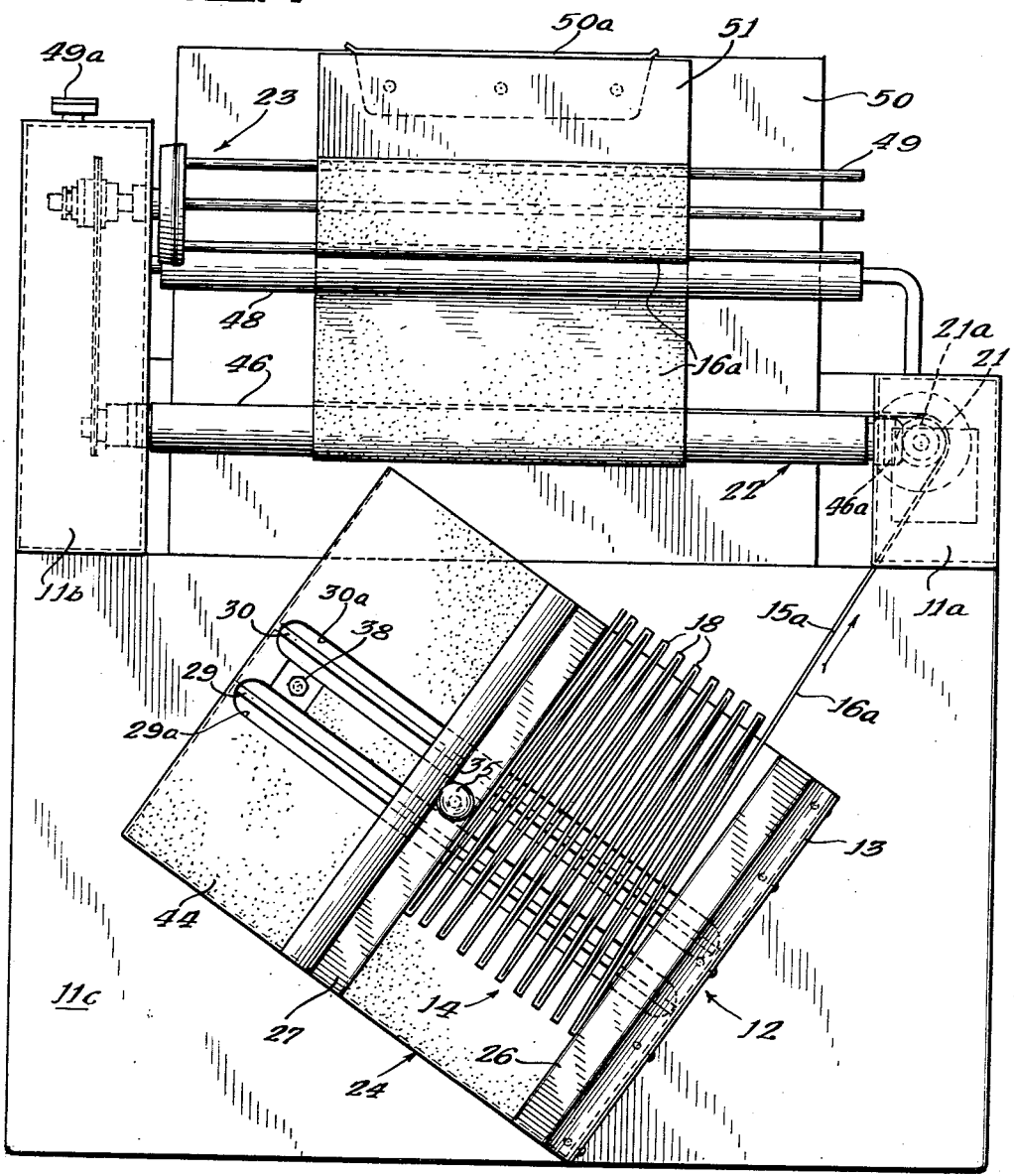
FIGURE 4 is a top plan view of the device shown in FIGURE 1 wherein one wall member of the paper receiving tray has been moved to aid in maintaining the stack upright on edge.

As shown in FIGURE 1, the deleaver 10 of this invention includes a frame 11 comprising two generally vertically extending laterally spaced upright members 11a and 11b and a horizontally disposed base member 11c generally normal thereto. Positioned on the base member 11c is a paper receiving means for holding a stationery stack on edge or paper receiving tray 12. The tray 12 has a generally box-like rectangular configuration with an opening at the top and two open sides. As shown in the plan view of FIGURE 4, it is angularly disposed on the top of the base member 11c relative to the upright members 11a and 11b. The tray is hinged to the base member 11c at one end 13 so that it may be tilted, as shown in FIGURE 10, to facilitate the reception of a zigzag folded stack of continuous form stationery 15 on edge, as shown in FIGURE 11, for feeding into the deleaver.

As shown in FIGURE 11, the zigzag folded stack of stationery 14 adapted to be deleaved by this invention consists of multiple plies of superposed strips of continuous form stationery 15 having interleaved therebetween sheets of transfer material or carbon paper 16. The stationery strips 15 are divided along their longitudinal extent into individual form lengths by transverse lines of weakening or fold lines 18 about which the stack is zigzag folded. A plurality of control punched holes 19 may be formed in either margin 20 and 20a thereof to facilitate feeding of the stationery through pin driven mechanisms.

The device of this invention is adapted to deleave stationery by pulling the lowermost ply of stationary 15a and the carbon sheet thereabove 16a from the stack of zigzag folded stationery resting on the marginal edges of the stationery. The stationery 15a and carbon sheet 16a are pulled from the stack on edge in a direction generally parallel to the longitudinal extent of the stationery and therefore generally normal to the lines of weakening thereof. The means for accomplishing this function is a vertically upright knurled driven roller 21 positioned in the upright member 11a near the tray 12 and having its longitudinal axis generally parallel to the transverse lines of weakening in the upright stack of stationery. From the driven roller 21 the stationery and carbon is directed to a means 22 for directing the stationery to another business machine or to refold into a zigzag stack, which will be explained later, and the carbon is directed to a means 23 for collecting the carbon sheets, which also will be explained later.

The paper receiving tray 12 includes supporting means 24 for maintaining the stationery stack on edge which comprises the tray platform member 25 and the two upright wall members 26 and 27 positioned thereon. Wall member 26 is positioned on the platform member 25 near the hinged end thereof. Wall member 27 is positioned on the base member opposite the wall 26 on the far end thereof when the deleaver is not in use. The wall member 27 is laterally movable relative to the platform member to adapt the supporting means for receiving stationery stacks of different thicknesses. The lateral mobility of the wall member 27 is facilitated by a traversing means 28 formed in the platform member 25. Included in the traversing means 28 are a pair of parallel rods 29 and 30 positioned in longitudinally extending parallel slots 29a and 30a, respectively, formed in the platform member 25. The wall member 27 also has a traversing means element which includes two pairs of bushings 31 and 31a and 32 and 32a which project below the bottom thereof and surround the rods 29 and 30 in tandem. This permits the wall member 27 to be laterally moved along the platform member and remain in its upright relation thereto.

Figure 5:
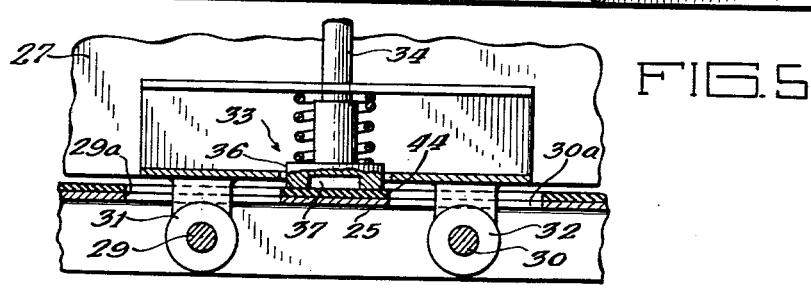
FIGURE 5 is an enlarged fragmentary view of a portion of the paper receiving tray.

A locking means 33 is provided for maintaining the wall member 27 in any preselected position along the platform member 25. The locking means 33 includes a spring loaded plunger member 34 which extends vertically through the wall member 27 on a line generally mid-way between the two bushings 31 and 32. A knob 35 extends outwardly from the top of the wall member 27 for actuation of the plunger member 34 and the bottom thereof has a recessed presser member which urges against the platform member 25 to affix the wall member at any preselected position thereon. As shown in FIGURE 9, the presser member 36 has a recessed portion 37 which is adapted to lock on an upstanding bolt 38 in the notch 39 formed in the surface of the platform member at the end thereof. This secures the wall member 27 against the lateral movement when it is at its extreme in position, such as when the deleaver is not in use. At selected positions along its path of travel the wall member is secured against lateral movement by the vertical pressure of the presser member bearing against the surface 44 of the platform member, as shown in FIGURE 5.

The tray 12 is hinged at 13 so as to be tiltable as shown in FIGURE 10 and facilitate easy loading thereof. The tray is loaded by first tilting thereof so that it assumes the position shown in FIGURE 10. Then the stack of stationery is placed in the tray so that the top ply thereof rests against the interior of the forward wall 26 and one side of the marginal edges thereof rests against the platform member 25 with the fold lines vertically upright. In such an upright position, the fold lines 18 form vertical columns which give strength to the stack in its on edge position.

The movable rear wall is then moved laterally to a position where it rests loosely against the other upright side of the stack, as shown in dotted outline in FIGURE 10, thus encasing the stationery on edge within the tray. It is not necessary that the rear wall be snugly positioned against the stationery stack, only that it be moved a sufficient distance to urge the stationery to maintain its position on edge within the tray to prevent twisting of the upright stack as stationery is pulled therefrom. The tray is then swung about its hinge 13 and assumes its normal position on top of the base 11 of the deleaver as shown in FIGURES 1, 2 and 4. The stationery is then in a position where it is ready to be fed into the deleaver.

The tilting of the tray member 12 is limited by a tilt limit means 41. Limit means 41 includes a rod 42 secured to the underside of the platform member 25 and extending through a hole 43 in the base member 11c. At the end of the rod 42 which extends through the hole 43 there is an enlarged area 42a of greater surface dimension than the hole 43. This enlargement limits the travel of the rod 42 and therefore the tilt of the tray 12.

It is preferable that the stationery be positioned within the tray so that portions thereof near the fold lines overlap relative to the platform member 25 toward the roller 21 about one-half inch as indicated in FIGURE 4. This overlap aids the free pull of stationery from the stack, preventing possible creasing thereof or tearing along the lines of weakening due to the direction of pull being other than perpendicular to the lines of weakening.

Tilting the tray to the approximate 45 degree angle shown in FIGURE 10 and then placing the stationery pack therein so that it will rest on its marginal edges when the tray is returned to its normal position, is a more convenient form of loading the deleaver. It has been found that such a method of loading can be done with a minimum of effort, which is a great advantage when handling heavy stationery packs. Also, loading in this fashion seldom results in the stationery spilling out of the operator's hands which might occur if the stationery were loaded in the upstanding position it assumes when the tray is returned to its normal position. Because the paper receiving tray has an open top, it is capable of holding continuous form stationery of indefinite dimension in width. Moreover, because the location of the side walls presents a limitation only to the thickness of the stack capable of being received in the tray, the tray is also capable of receiving stationery of indefinite dimension in form length. The greater the dimension of the individual form length the more the rear end of the stack may extend out of the tray. Thus the paper receiving tray is capable of handling continuous form stationery of greater dimension both in individual form length and width.

To initiate the deleaving action the lowermost ply of stationery 15a (meaning that ply of stationery which is the bottom ply when the stationery is in its normal superposed position) and the carbon sheet thereabove 16a are pulled out first to be fed to the upright driving roller 21. This means that the slick uncoated side 17a of the carbon is being pulled relative to the remainder of the stack while the coated, relatively gummy side, of the carbon 17b remains fixed relative to the lower ply of stationery. This produces two advantageous results. First, there is very little frictional engagement between the slick side of the carbon sheet and the bottom side of the next adjacent sheet of stationery as the lowermost ply of stationery and carbon sheet thereabove are pulled from the upright stack. Secondly, because the transfer side of the carbon sheet remains fixed relative to the stationery ply, there is no smear caused by the pull of the stationery and the carbon from the stack.

The tray 12 is provided with a retaining means for retaining the remaining plies of stationery and transfer material therein when the lowermost ply of stationery and carbon sheet thereabove are being pulled from the stack. This retaining means comprises a soft, coarse textured rubber surface 44 on the platform member 25 on the tray. This rubber material has a high coefficient of friction with the marginal edges of the paper in the upright stack. Only the marginal edges of the stationery and carbon rests directly on the rubber material with the weight of the stationery thereupon. The coefficient of friction between the base material and the remainder of the stack is greater than the coefficient of friction of pull out between the slick side of the carbon and the surface of the stationery ply next adjacent. This insures that the balance of the stationery in the pack will remain on the base member and only one ply of stationery carbon will be pulled therefrom at a time. This relationship between the rubber surface and the remainder of the pack works independently of the width of the carbon sheets interleaved.

Located in the path of travel of the stationery through the machine is a means 22 for directing the separated carbon strip and stationery ply from the pack so that the stationery ply may be fed to an associated business machine or directed to refold into a zigzag folded stack of one ply. This directing means 22 includes the vertical driven roller 21, the angled idler roller 45 and a horizontal driven roller 46. The driven vertical roller 21 is located at the top of the upright portions 11a and 11b of the frame 11 and journalled for rotation therebetween so that its axis of rotation is generally vetrical. The roller 21 provides a means for pulling the stationery and carbon from the stack on edge in a direction generally normal to the transverse lines of weakening or, in the direction of the longitudinal extent of the stationery.

In the preferred embodiment of the invention the driven roller 21 is specified as being vertically upright. It is preferable that the stationery be pulled from the stack in a direction generally perpendicular to the transverse lines of weakening. Such a direction of pull eliminates the possibility of the stationery tearing along the lines of weakening, also minimizes the possibility of creasing the stationery, and further allows the lowermost ply of stationery and carbon thereabove to be pulled from the stack with a minimum effort so that the important balance of coefficient of friction between the marginal edges of stationery and the surface 44 of the platform member 25 will not be upset. It is to be remembered that the stationery is positioned on its marginal edges on a platform member having a relatively coarse, soft textured surface. This produces a relatively high coefficient of friction with the stationery edges so that the column strength of the stack may combine with the weight of the stationery along the marginal edges thereof to maintain the stationery in such a position while the lowermost ply of stationery and carbon sheet thereabove are being pulled from the stack in a direction generally normal thereto. These factors, together with the supporting aid given by the wall members, insure that the upright relation of the remainder of the stack is not disturbed. Thus the desired position for the drive roller 21 is that it be generally parallel to the transverse lines of weakening of stationery being pulled or, in any event, be so positioned as to exert a pull on the stationery which is substantially perpendicular to the lines of weakening thereof.

The idler roller 45 provides a means for changing the plane of travel of the stationery through the deleaver. The idler roller 45 is journalled for rotation diagonally across the upright portions 11a and 11b at a generally 45 degree angle to the horizontal and, therefore, to the upright roller 21. As illustrated in the diagrammatic view in FIGURE 3, the function of this roller is to receive the stationery which is being fed through the deleaver on edge with the transverse lines of weakening generally normal to horizontal and transfer the plane of travel so that the lines of weakening thereof will be generally parallel to horizontal. In order for the roller 45 to perform this function of changing the plane of travel of the stationery it is desirable that it be journalled at generally 45 degrees angle to the lines of weakening and the upright roller 21, which, in the case of the preferred embodiment, also places it at a 45 degree angle to horizontal.

Extending across the top of the upright members 11a and 11b generally normal to the roller 21 is the horizontal drive roller 46. This roller provides a means for driving the stationery vertically upward from the roller 45 so that it may be fed generally horizontally from the deleaver or deflected into a vertical descent which will cause the stationery ply to assume a zigzag folded stack as shown in FIGURE 1. The roller 46 is operatively associated with the driving means for the deleaver mechanism (not shown) and, by means of cooperatively beveled gears 46a formed at one end of the horizontal roller and 21a formed at one end of the upright roller, receives driving force from the upright driven roller 21.

Located in the path of travel of the carbon and stationery beyond the horizontal drive roller 46 is a means for collecting the strips of transfer material 23. Collecting means 23 includes an idler roller 48 and a carbon rewind reel 49 both generally parallel to the horizontal drive roller 46 and vertically displaced therefrom. The idler roller 48 is laterally spaced from the vertical descent of the stationery and carbon sheets. When the stationery and carbon sheet are fed over the horizontal roll 46, the carbon sheet is above the stationery ply. The stationery and carbon may then be fed downward as shown in FIGURE 1. Carbon is wrapped underneath and around the idler roll with its slick non-coated surface in contact therewith to send it generally vertically upward, as indicated by the arrow in FIGURE 1, and then wound around the rewind spindle reel 49. The rewind reel is driven through operable association with the deleaver drive source. The amount of the driving force of the rewind reel may be varied through the adjustment knob 49a. When the deleaver of this invention is used in conjunction with another business machine, such as a burster, it is desirable that less pulling force be exerted on the carbon on the rewind reel and therefore the adjustment may be made accordingly.

Positioned behind the upright portion 11a and below the carbon rewind reel and horizontal drive roller is a means for containing the deleaved stationery in a zigzag folded stack or refold shelf 50. As the stationery passes down the rear of the upright portions 11a and 11b and behind the idler wheel 48, it is kept close to the upright members 11a and 11b and in general vertical alignment therewith. As shown in FIGURE 1, when the stationery strikes the refold shelf it is urged into a zigzag folded stack 51 of deleaved stationery. The rearward facing fold line 18a breaks the column strength of the vertically descending stationery ply and urges the forward facing fold line 18b outward and downward, thus forming a zigzag fold. The cycle is repeated as the stationery continues to vertically descend from the horizontal drive roller 46. The refold shelf normally is positioned inside the frame 11 of the deleaver when not in use. The shelf may be pulled out a desired length corresponding to individual form lengths of the stationery being deleaved. The upstanding rear wall 50a of the shelf 50 cooperates therewith to maintain a neat folded stack of deleaved stationery by limiting the outward movement of the stationery and confining the stack therein.

After the stack of stationery has been placed on edge within the tray and the tray has been swung back to a horizontal position on top of the base member 11c, the deleaver is easily set up for operation. The next step for the operator is to pull out the lower stationery ply and carbon sheet thereabove and wrap it around the upright driven roller 21 as indicated in FIGURE 3. From there it is wrapped behind the roller 45 and then pulled vertically up in front of the roller and over the top of the horizontal driven roller 46 as indicated by the arrows C and D in FIGURE 3. The carbon sheet is then brought to the idler roller 48 and up to the rewind reel 49 and wrapped therearound as indicated by the arrows D and E in FIGURE 1. The machine is then ready for the deleaving operation. Each time a ply of stationery and carbon are removed from the stack it is only necessary to rethread the next lower stationery ply and carbon strip thereabove in the manner previously explained. It also may be desirable to move the wall member 27 to compensate for the amount of stationery removed from the stack. It is not necessary that the original stack be handled again after it has been placed in the tray. It is also not necessary to initiate a refolding action for the deleaved stationery ply. As previously explained, the stationery ply will be caused to refold on its own when the refold shelf is pulled out a distance comparable to the dimension of an individual form length.

The device of this invention provides a deleaver mechanism wherein the original stack of zigzag folded continuous form stationery is handled only once, regardless of the number of plies of stationery therein. Furthermore, this new deleaver is easily loaded and set up for operation. All these features result in savings of both time and labor. This deleaver is also capable of handling stationery of increased dimensions as well as present sized stationery. The deleaved strips of stationery may be fed into another business machine or refold in a zigzag folded stack, while the interleaved carbon is being removed on a separate spindle. Thus this new deleaver is extremely versatile as well as affording greater ease of operation and requiring less operator attention.

The foregoing detailed description is given for clearness of understanding only and no unnecessary limitations should be understood therefrom, as modifications will be obvious to those skilled in the art.

We claim:

1. A device for deleaving zigzag folded stacks of superposed strips of continuous form stationery having transverse lines of weakening and in which the stationery strips have opposite marginal edges superposed to form a pair of marginal edges of the stack with strips of transfer material interleaved therebetween, comprising: means for holding a stack of zigzag folded stationery on one of said marginal edges of said stationery strips, driven means for pulling at least one strip of said stationery and one strip of said transfer material from said stack while held on said edge; a plurality of rolls for guiding and turning the stationery so that the transverse lines of weakening of said stationery will be changed from vertical to horizontal, said rolls being adapted to direct said stationery into deleaved relation with said stack.

2. A device for deleaving zigzag folded stacks of superposed strips of continuous form stationery in which the stationery strips have opposite marginal edges superposed to form a pair of marginal edges of the stack with strips of transfer material interleaved therebetween, comprising: means for holding said stack of zigzag folded stationery on one of said marginal edges of said stationery strips; driven means for pulling at least one strip of said stationery and one strip of said transfer material from said stack while held on said edge; retaining means for retaining the remaining strips of stationery and transfer material in said holding means; means for collecting said transfer material separate from said stationery strip; and means for directing said stationery from said pack to said pulling means and into deleaved relation with said stack.

3. The device of claim 2 including supporting means for maintaining said zigzag folded stack on edge in said holding means.

4. The device of claim 1 wherein said means for directing said stationery includes means for changing the plane of said stationery from generally upright to generally horizontal so that the strip may be refolded in a zigzag pack.

5. A device for deleaving zigzag folded stacks of superposed strips of continuous form stationery in which the stationery strips have opposite marginal edges superposed to form a pair of marginal edges of the stack with strips of transfer material interleaved therebetween, comprising: means for holding said stack of zigzag folded stationery upright on one of said marginal edges of said stationery strips so that the weight of said stack holds the same on the edge of said stationery; means for pulling at least one strip of said stationery and one strip of said transfer material from said stack while held on said edges; retaining means for retaining the remaining strips of stationery and transfer material in said holding means including a platform member having a surface having a high coefficient of friction with the marginal edge of said stationery; means for collecting said transfer material separate from said stationery strip; and means for directing the stationery from said pack and said pulling means into deleaved relation with said stack.

6. A device for deleaving zigzag folded stacks of superposed strips of continuous form stationery in which the stationery strips have opposite marginal edges superposed to form a pair of marginal edges of the stack and having transverse lines of weakening with strips of transfer material interleaved therebetween, comprising: receiving means for holding said zigzag folded stack of stationery on one of said marginal edges of the stationery; means for pulling at least one strip of said stationery and the strip of transfer material thereabove from said zigzag folded stack when held on said edges; retaining means for retaining the remaining plies of stationery and transfer material on edge in said receiving means including a platform member having a surface having a high coefficient of friction with the marginal edges of said stationery and means for directing said strip of transfer material and said stationery strip from said stack to separate locations.

7. The device of claim 6 in which the receiving means comprises a platform with upstanding walls adjustable relatively to form a variable width space therebetween to hold the stationery on edge without buckling while permitting space between the zigzag folded form lengths for removal of a single strip from the stack by a pull thereof toward the side of the stack.

8. The device of claim 6 wherein said means for directing said stationery includes means for changing the plane of said stationary from generally upright to generally horizontal so that said strip may be refolded in a zigzag pack.

9. A device for deleaving zigzag folded stacks of superposed strips of continuous form stationery having transverse lines of weakening with strips of transfer material interleaved therebetween, comprising: receiving means for holding said folded stack of stationery on the marginal edge of the stationery strips with the lines of weakening generally perpendicular to horizontal, said receiving means including a platform member and a pair of opposed wall members defining a paper receiving tray, said tray being tiltable about one edge to facilitate easy loading of stationery placed by gravity against one wall member thereof; means for pulling said stationery and transfer material from said zigzag folded stack on edge in a direction generally perpendicular to said transverse lines of weakening; means on said platform member gripping the remainder of the zigzag folded stack and holding the same on said platform as the lowermost strip of stationery and transfer sheet thereabove are pulled therefrom; means for directing the stationery and transfer strips from the stack so that the stationery may be separated from said transfer strip including means for changing the plane of travel of the stationery so that the transverse lines of weakening will be generally parallel to horizontal when so separated, and means for collecting the strips of transfer material.

10. The device of claim 9 wherein said platform member has one movable upstanding wall for accommodating stationery stacks of different widths for aiding said stack in maintaining its upright position on edge so that the stationery may be pulled out of the stack without twisting.

11. A device for deleaving zigzag folded stacks of superposed stationery strips in which the stationery strips have opposite marginal edges superposed to form a pair of marginal edges of the stack comprising: receiving means for holding said stack of manifolded material on one of said marginal edges of said stationery strips; driven means for pulling at least one strip of manifolded material from said stack while held on said edge; retaining means for retaining the remaining strips of manifolded material in said holding means; and means for directing said strips of manifolded material from said stack to separate locations.

12. A device for deleaving zigzag folded stacks of superposed strips of continuous form stationery in which the stationery strips have opposite marginal edges superposed to form a pair of marginal edges of the stack and wherein said stack has strips of transfer material interleaved therebetween, comprising: means for holding said stack of stationery on one of said marginal edges; driven means for pulling one strip of stationery and the sheet of transfer material thereabove from said stack while held on said edges; retaining means for retaining the remaining strips of stationery in said receiving means; and means for directing said strips of stationery from said stack to separate locations.

13. A device for deleaving zigzag folded stacks of superposed strips of continuous form stationery in which the stationery strips have opposite marginal edges superposed to form a pair of marginal edges of the stack and wherein said stack has strips of transfer material interleaved therebetween, comprising: means for holding said stack of zigzag folded stationery on a marginal edge of said stationery strips; driven means for pulling one strip of stationery and the strip of transfer material thereabove from said stack while held on said edge; retaining means for holding the remaining strips of stationery and transfer material on the marginal edges thereof in said holding means including a platform member with a surface having a high coefficient of friction with the marginal edge of said stationery; means for collecting said transfer material separate from said stationery strips and means for directing said stationery strips to separate locations.

14. A device for deleaving zigzag folded stacks of superposed strips of continuous form stationery having transverse lines of weakening with strips of transfer material interleaved therebetween, comprising: receiving means for holding said folded stack of stationery on the marginal edge thereof with the lines of weakening generally perpendicular to horizontal, said receiving means including a platform member with a surface having a high coefficient of friction with the marginal edges of said stationery and a pair of opposed wall members defining a paper receiving tray, said tray being tiltable about one edge to facilitate easy loading of stationery placed against one wall member thereof, means for pulling said transfer material from said zigzag folded stack on edge in a direction generally perpendicular to said transverse lines of weakening; means for directing the stationery and transfer sheets from the stack so that the stationery may be replaced from said transfer strips including means for changing the plane of travel of the stationery so that the transverse lines of weakening will be generally parallel to horizontal when so separated, and means for collecting the strips of transfer material.

15. A device for deleaving zigzag folded stacks of superposed strips of continuous form stationery having transverse lines of weakening with strips of transfer material interleaved therebetween, comprising: receiving means for holding said folded stack of stationery on the marginal edge thereof with the lines of weakening generally perpendicular to horizontal, said receiving means including a platform member with a surface having a high coefficient of friction with the marginal edges of said stationery and a pair of opposed wall members defining a paper receiving tray, said tray being tiltable about one edge to facilitate easy loading of stationery placed against one wall member thereof, means for pulling the lowermost strip of stationery and transfer sheet thereabove from said zigzag folded stack on edge in a direction generally perpendicular to said transverse lines of weakening; means for directing the stationery and transfer sheets from the stack so that the stationery may be replaced from said transfer strips including means for changing the plane of travel of the stationery so that the transverse lines of weakening will be generally parallel to horizontal when so separated and means for collecting the strips of transfer material.

References Cited in the file of this patent
UNITED STATES PATENTS

| 2,049,085 | Sherman | July 28, 1936 |
| 2,092,029 | Sherman | Sept. 7, 1937 |
| 2,280,224 | Euth | Apr. 21, 1942 |